United States Patent [19]

Oren, III et al.

[11] 4,128,095
[45] Dec. 5, 1978

[54] SOLAR ENERGY COLLECTOR

[75] Inventors: Jess W. Oren, III, Washington Boro; Eugene M. Kirchner, Maytown; Charles F. Wehry, Jr., Lancaster, all of Pa.

[73] Assignee: Armstrong Cork Company, Lancaster, Pa.

[21] Appl. No.: 834,320

[22] Filed: Sep. 19, 1977

[51] Int. Cl.² .............................................. F24J 3/02
[52] U.S. Cl. ..................................... 126/270; 126/271
[58] Field of Search ............... 126/270, 271; 237/1 A

[56] References Cited

U.S. PATENT DOCUMENTS

| | | | |
|---|---|---|---|
| 3,412,728 | 11/1968 | Thomason | 126/270 |
| 3,985,116 | 10/1976 | Kapany | 126/270 |
| 4,046,133 | 9/1977 | Cook | 126/270 |
| 4,072,142 | 2/1978 | Lof | 126/270 |

Primary Examiner—Kenneth W. Sprague

[57] ABSTRACT

A solar energy collector in which gas is heated comprising a substantially transparent outer member overlying a corrugated, thermally conductive absorbent transformer means separated from the outer member by a longitudinal fluid space. The corrugations of the thermally conductive absorbent transformer are disposed at an angle in the collector and the transparent outer member is separated from the peaks of the corrugations by an amount such that the flow of gas through the collector assumes a helical pattern. Efficient scrubbing of the thermally conductive absorbent transformer surface results.

1 Claim, 3 Drawing Figures

SOLAR ENERGY COLLECTOR

BACKGROUND OF THE INVENTION

1. Field of the Invention

This invention relates to the general field of solar heating devices, and, more specifically, the present invention relates to a solar heat collector utilizing a specific heat collecting material for receiving solar energy.

2. Description of the Prior Art

The prior art discloses various heating devices for utilizing solar radiation to heat the interiors of building, with means for storing the heat when not needed.

U.S. Pat. No. 3,412,728—Thomason describes a typical solar heating device comprising a solar heat collector, having an outer transparent covering overlaying a corrugated heat collecting metallic sheet, preferably treated on its outer surface to absorb sun rays and convert them to infrared heat. The apparatus is provided with a passage means between the outer cover and metallic sheet so as to allow the passage of air to carry away heat absorbed by the sheet.

One of the most frequently used heat collecting materials of such solar heating devices is a metal surface coated with carbon black to increase its heat absorbing factor as exemplified in U.S. Pat. No. 3,359,183—Kenk.

Other materials commonly used to absorb energy from the sun are various black fabrics. For example, U.S. Pat. No. 3,174,915—Eblin describes a solar still utilizing a non-woven, loose, open black fabric composed preferably of polyacrylonitrile fibers which may be treated with a binder to impart sufficient body to retain its shape.

For the most part, however, most of the known solar energy collecting devices have proven to be bulky and heavy in construction, with the absorbent materials used therein susceptible to degradation by light, heat, or moisture, inefficient and/or especially costly to produce and replace. The present invention, on the other hand, provides a solar heat collector that is extremely lightweight, strong, easily installed, long lasting, inexpensive to produce, maintain, and replace, highly efficient, and utilizing absorbent materials extremely resistant to degradation by heat, light, or water.

SUMMARY OF THE INVENTION

In accordance with the present invention, a solar energy collector comprising and utilizing as absorbent material a rubberized felted sheet containing known solar selective materials treated with a thermosetting resin.

DESCRIPTION OF THE PREFERRED EMBODIMENTS

Figure 1:
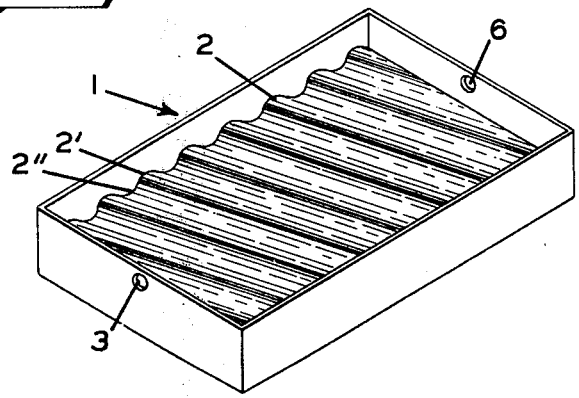
FIG. 1 is a perspective view of the preferred corrugated solar heat collector.

The solar collector in accordance with the present invention utilizes a construction that allows a very high rate of heat transfer between the circulating gas and the thermally conductive absorbent transfer means. Referring now to the drawings, FIGS. 1 and 2, the solar heat collector 1 of the preferred construction is comprised of a corrugated absorbent sheet 2 preferably treated on its upper surface with materials that strongly absorb sunlight. Gases, preferably air, enter the apparatus at 3, traveling over peaks 2' and valleys 2" of the corrugated sheet 2, exiting the collector at gas outlet 6. The effectiveness of the collector, in accordance with the present invention, is in part dependent upon the angle of the disposition of the corrugations relative the direction of gas flow in the collector and the separation of the outer member 7 from peaks 2'. It is disadvantageous to have the air flow in a laminar manner through the valleys 2" to outlet 6, such as would occur if the tops of the corrugations 2' were too near or too distant to the outer member 7. When the space between the peaks 2' and the outer member 7 is at least ⅜ inch and not more than ⅝ inch, and the angle of corrugation is at least 30°, but not more than 90°, effective heat transfer is obtained between the thermally conductive absorbent transformer means 2 and the flowing gases. Good results are obtained with a spacing of ½ inch and an angle of corrugation of 45°. FIG. 3 illustrates the operation of the critical features of the collector in accordance with the present invention. Air flow, illustrated by the arrows in the Figures, moves over the peak 2" at an accelerated rate due to the venturi effect. However, as this accelerated air exits the confines of the space between 2' and 7 into the valley of the apparatus, the frictional drag from the peak 2' causes the gas to tumble. Vectorially, the gas is moving from 3 to 6, and superimposed on such vectorial flow is the tumbling effect. The net result is that the gas flows in a helical or vortex manner from the entrance to the exit. It is this type of flow that allows the gas to efficiently scrub the surface of the absorber 2.

The outer member 7 is formed from any material transparent to solar energy rays. Although only one of these cover plates, preferably glass, is illustrated, it is to be understood that two or more could be provided. However, the single outer member 7 has an affect on the efficiency to be obtained from the collector. In cases of low differentials of temperature between the collector and ambient temperature, a single outer member is more efficient than two or three members. This is related to the heat balance between the losses of the collector and the solar radiation reflected by the collector. The lower the temperature of the collector, the lower will be the heat loss to the surroundings. In two or three outer member installations, better insulation and lower heat loss to the surroundings is obtained. However, for each additional outer member incorporated in the apparatus, 80% of the incident radiation is reflected. Thus, for a single outer member, 92% of the energy enters past the outer member. A second outer member added causes a decrease of such incident energy to 84.6%. In a three outer member system, only 78% of the indicent energy arrives at the surface of the absorber means. Two or three outer members allow higher absorber temperatures to develop, which is desirable for certain applications. However, for a most efficient absorber that operates at low outlet temperatures, i.e. about 100° F., a single outer member is utilized.

One of the economically most acceptable materials to use in forming the thermally absorbent transformer 2 are beater saturated rubberized fiber sheets, normally employed in the cooling tower industry as water resistant fill material. These function well in the collector apparatus because the rough surface of such enhance the aforementioned frictional air drag. Such a sheet is lightweight, and when saturated with a thermosetting resin, becomes strong and stiff. It is highly efficient and inexpensive to produce, maintain and replace. Additionally, due to the presence of the thermosetting resin in its composition, it is extremely resistant to deterioration from heat, light and water. Moreover, such a heat collecting sheet can be used in many, if not all, of the known solar heating devices. For example, it may be utilized within the aformentioned U.S. Pat. No. 3,412,728—Thomason.

The production of fibrous sheets, particularly rubber-bonded asbestos fiber sheet material by the customarily used beater saturation processes, contemplates forming a slurry of paper-making fibers in water.

Asbestos fibers are the preferred paper-making fibers and will usually be chrysotile, although crocidolite fibers or mixtures of chrysotile and crocidolite may be used, as well as anthophyllite fibers. The slurry of asbestos fibers will be formed in a known manner. The fibers are added to sufficient water in a chest or other convenient container in an amount such that the resulting slurry contains about 5% to 8% by weight fibers. They will be slurried in water to the usual consistency of beater saturation process, normally in the range of about 0.5% to 23.0% by weight fibers in the slurry. The preferred consistency is about 2% to 2.5%. The fibers will normally be subjected to beating or other mechanical refining treatments such as Jordan engines, disc refiners, or the like in accordance with normal processes in order to produce a slurry wherein the fibers have been reduced to the desired length and diameter.

After forming the slurry in the desired consistency and after any mechanical refining, the slurry will be subject to any of the normal processes customarily used in the beater saturation of such fibers. Such processes include treatment of the fibers with such agents as sodium lignosulfonate-sodiumcitrate mixtures, or the selected water-soluble polycarboxylic acids and/or the water-soluble salts thereof as described in U.S. Pat. No. 2,759,813—Feigley.

The next step will be the addition of known solar selective materials in fine or powdered form to the refined and pretreated slurry. For example, carbon black, commonly used as a pigment, is an excellent absorber of the infrared and can be incorporated in amounts sufficient to cover all of the fibers. Other materials which can be incorporated to enhance certain desired solar properties include metallic powders such as copper oxide which increase thermal conductivity of the sheet for rapid heat transfer to a circulating fluid, and metal oxides such as the oxides of copper, which have high absorbents and low emittants which serves to increase the efficiency of the sheet.

The powered solar selective materials will simply be added by mixing the dry powders with the fibrous slurry, with sufficient agitation to maintain the powdered materials in suspension with the fibers in the slurry. At this point in the process, the powdered materials are present simply as mechanically disbursed powders in the slurry.

The total amount of solar selective materials in powdered form to be added to the slurry will vary from about 1% to 6% by weight based on the dry weight of the fibers depending upon the particular characteristics desired. However, at least 1% of such solar selective materials must be present in order to enhance the solar absorbing properties of the resulting sheet.

Alternatively, the solar selective materials may be added to the slurry along with the fibers before mechanical refining and pretreatment of the fibers.

The next step in the process is the addition of a synthetic rubber latex binder to the slurry containing the disbursed powdered solar selective materials. The synthetic latices to be used in the present process may be any of the latices customarily used in beater saturation processes. The synthetic rubber latices may comprise copolymers of butadiene and styrene, usually containing about 50%–70% by weight butadiene. The NBR rubbers, copolymers of butadiene and acrylonitrile may also be used as may the polychloroprenes, which are polymers of 2-chlorobutadiene-1,3. However, homopolymers and copolymers of neoprene are preferred. Other latices which may be used include, but are not limited to, homopolymers of butadiene as well as homopolymers and/or copolymers of butadiene homologs such as isoprene, and the so-called butyl rubber latices. The chosen synthetic rubber latex is simply added with agitation to the pretreated fibrous slurry containing the disbursed solar selective materials. Since the fibers have been pretreated for beater saturation, agitation will usually suffice to precipitate the binder onto the fibers.

The amount of synthetic rubber latex binder to be added will generally be in the range of about 3%–50% by weight rubber binder based on the dry weight of the fibers. For the primary purpose of the present invention, it is preferred to add about 9% to 20% by weight of the synthetic rubber latex binder.

Once the binder has deposited on the fibers, a suitable sheet may be formed from the resulting slurry. The sheet may be formed by any of the conventional methods in the paper-making art. A sheet mold may be used, as may a fourdrinier wire, or a felt-making wire cylinder. The water will be drained from the sheet, and the sheet will be dried in the usual manner. Drying will normally be carried out on heated drums, and ovens, or the like. The thickness of the sheet can be varied at will by controlling the amount of slurry deposited per unit area on the wire. A typical sheet will have a thickness varying from 0.019 inch to 0.032 inch and a density nominally of 54 to 58 pounds per cubic foot.

At this time, the dried sheet is supple and may be handled in roll or sheet form. It may be used in this state as a solar absorber. As such, it is neither water resistant nor is it stiff and its heat resistance is solely dependent on the latex used as the binder. For most solar collector designs, additional qualities such as strength, stiffness, permanence of shape, water and heat resistance are desired. These properties are obtained by treatment of the sheet with suitable resins. Thermosetting resins such as melamines and phenolics may be used to thoroughly saturate the material, and upon drying and subsequent curing, impart these qualities.

The dried sheet is conveniently treated with a thermosetting resin by passing the dried sheet on rollers into or through a bath of the resin and carrier fluid such as water so that the desired percentage of resin will impregnate the sheet. The preferred percentage is about 10% to 15% resin based on the dry weight of the sheet. Upon emerging from the bath, the sheet again is flexible and supple and can be vacuum formed into a corrugated shape, dried and cured in this shape. The resultant sheet is stiff and will maintain its form. It is strong and can be incorporated into either single plate absorbers or further fabricated by foaming one side of the material with a rigid foam to create an even stiffer panel. In this state, it may be used wet or dry and suffer no degradation from heat, light or moisture.

In place of the corrugated absorbent means of the earlier discussion, any absorbent means can be used that has a shape such that the vortex flow (helical flow) occurs.

Figure 2:
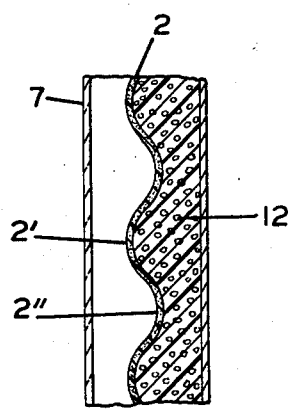
FIG. 2 is a diagrammatic cross section through the apparatus.
Figure 3:
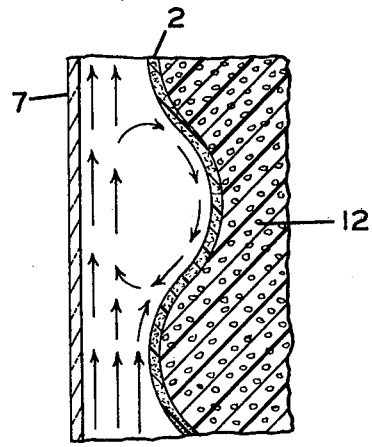
FIG. 3 is an enlarged detail of the solar heat collector of preferred construction.

It is desirable to have the absorbent transformer means overlying a material of low thermal conductivity, as seen in FIGS. 1 and 2. Such low thermal conductivity material 12 can be economically wood, fiber glass or plastic foam.

The following example illustrates an embodiment of the invention. All parts are by weight unless otherwise stated.

EXAMPLE

The following formulation was prepared in water with a 1.9% consistency of asbestos to the total mix:

| Ingredients | Parts |
| --- | --- |
| Asbestos | 88.8 |
| Antioxidant (condensation product is symmetrical dibetanaphtholpara phenylene diamine) | 0.2 |
| Pigment (carbon black) | 1.3 |
| Neoprene LD450 (chloroprene plus acrylonitrile copolymer | 9.7 |
| | 100.0 |

The asbestos was added to the water with agitation and the powdered carbon black was next added. No special pretreatment steps were required. The synthetic rubber latex binder (Neoprene LD-450) was next added. The binder particles and carbon black precipitated on the asbestos fibers over a period of one to two minutes. When the water cleared showing that precipitation was complete, the rubber-coated fibers and water were poured into a small sheet mold and drained. The web was then gently pressed to remove additional water and was dried in an oven.

The dried sheet was dipped in a resin bath containing a solution of 50% melamine and 50% phenolic for 10 seconds. On removal from the resin bath, the sheet was placed in a forced air circulating oven for several minutes until dry.

The resulting sheet was stiff, boardlike, and could readily be formed into a corrugated shape suitable for use as a solar absorbing material.

What is claimed is:

1. A solar energy collector comprising:
   (a) an outer member substantially transparent to solar energy rays;
   (b) a corrugated, thermally conductive absorbent transformer means spaced from said outer member;
   (c) a longitudinal fluid space having an inlet aperture and an outlet aperture disposed between said transformer means and said outer member;
   (d) a gas within said longitudinal fluid space wherein said absorbent transformer means heats said gas;
   (e) means for directing said gas from said inlet aperture to said outlet aperture through said longitudinal fluid space; and
   (f) said absorbent means having its corrugations so constructed and arranged as to be diagonally disposed to the flow of said gas and said outer member means being spaced from said corrugations of said absorbent transformer means so as to induce helical flow of said gas from the inlet aperture to the outlet aperture.

* * * * *